US011086208B2

(12) United States Patent
Ono et al.

(10) Patent No.: US 11,086,208 B2
(45) Date of Patent: *Aug. 10, 2021

(54) DISPLAY DEVICE

(71) Applicant: FUJIFILM Business Innovation Corp., Tokyo (JP)

(72) Inventors: Masafumi Ono, Kanagawa (JP); Tomotaka Matsuyuki, Kanagawa (JP); Sayaka Hirose, Kanagawa (JP); Yuri Takeuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,763

(22) Filed: Sep. 30, 2019

(65) Prior Publication Data

US 2020/0033716 A1 Jan. 30, 2020

Related U.S. Application Data

(63) Continuation of application No. 15/903,520, filed on Feb. 23, 2018, now Pat. No. 10,474,025.

(30) Foreign Application Priority Data

Mar. 24, 2017 (JP) .................................. 2017-058361

(51) Int. Cl.
*G03B 21/62* (2014.01)
*G03B 17/54* (2021.01)
*G03B 21/10* (2006.01)

(52) U.S. Cl.
CPC ............. *G03B 21/62* (2013.01); *G03B 17/54* (2013.01); *G03B 21/10* (2013.01)

(58) Field of Classification Search
CPC ........ G03B 21/62; G03B 21/625; G09G 5/14; G09G 5/363; G09G 5/373; G09G 5/377
See application file for complete search history.

(56) References Cited

U.S. PATENT DOCUMENTS 5,198,729 A * 3/1993 Powell ..................... G09G 1/00
313/479
2005/0200955 A1 9/2005 Ma et al.
2006/0152802 A1 7/2006 Tsai et al.
(Continued)

FOREIGN PATENT DOCUMENTS

JP 2006-195475 A 7/2006

*Primary Examiner* — Dong Hui Liang
(74) *Attorney, Agent, or Firm* — Sughrue Mion, PLLC

(57) ABSTRACT

A display device includes a screen, first and second projectors, a detector, and a controller. The screen has first and second surfaces. The first projector projects a first horizontally non-inverted image as viewed from the first surface. The second projector projects a second horizontally non-inverted image as viewed from the second surface. The detector detects a person viewing the first surface and a person viewing the second surface. The controller controls switching of an operation between the first and second projectors and also performs control, when the detector has detected a person viewing the first surface and a person viewing the second surface, so that the person viewing the first surface and the person viewing the second surface are able to see each other through the screen.

4 Claims, 13 Drawing Sheets

(56) References Cited

U.S. PATENT DOCUMENTS

| | | | |
|---|---|---|---|
| 2007/0218217 A1* | 9/2007 | Fernando | G02F 1/133305 428/1.31 |
| 2008/0150853 A1* | 6/2008 | Peng | G09G 3/3426 345/87 |
| 2012/0140304 A1* | 6/2012 | Kuhlman | G02F 1/1347 359/228 |
| 2012/0256886 A1* | 10/2012 | Ryu | G06F 3/0488 345/204 |
| 2013/0265232 A1* | 10/2013 | Yun | G06F 3/011 345/158 |
| 2014/0204023 A1* | 7/2014 | Kumar | G09G 3/20 345/156 |
| 2014/0347267 A1* | 11/2014 | Nishi | G06F 1/1643 345/156 |
| 2015/0256803 A1 | 9/2015 | Alhazme | |
| 2017/0060512 A1* | 3/2017 | Rakshit | G06F 3/041 |
| 2018/0033171 A1* | 2/2018 | Rakshit | G06K 9/00624 |
| 2018/0079284 A1* | 3/2018 | Choi | B60K 35/00 |

\* cited by examiner

DISPLAY DEVICE

CROSS-REFERENCE TO RELATED APPLICATIONS

This application is a Continuation of U.S. application Ser. No. 15/903,520 filed Feb. 23, 2018, which is based on and claims priority under 35 USC 119 from Japanese Patent Application No. 2017-058361 filed Mar. 24, 2017, the disclosures of which are incorporated herein by reference in their entireties.

BACKGROUND

(i) Technical Field

The present invention relates to a display device.

(ii) Related Art

Nowadays, collaboration is becoming more and more demanded regardless of the types of jobs, and mediums and tools for connecting people naturally and effectively are accordingly being demanded.

SUMMARY

According to an aspect of the invention, there is provided a display device including a screen, first and second projectors, a detector, and a controller. The screen has first and second surfaces. The first projector projects a first horizontally non-inverted image as viewed from the first surface. The second projector projects a second horizontally non-inverted image as viewed from the second surface. The detector detects a person viewing the first surface and a person viewing the second surface. The controller controls switching of an operation between the first and second projectors and also performs control, when the detector has detected a person viewing the first surface and a person viewing the second surface, so that the person viewing the first surface and the person viewing the second surface are able to see each other through the screen.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the accompanying drawings.

[Configuration]

Figure 1A:
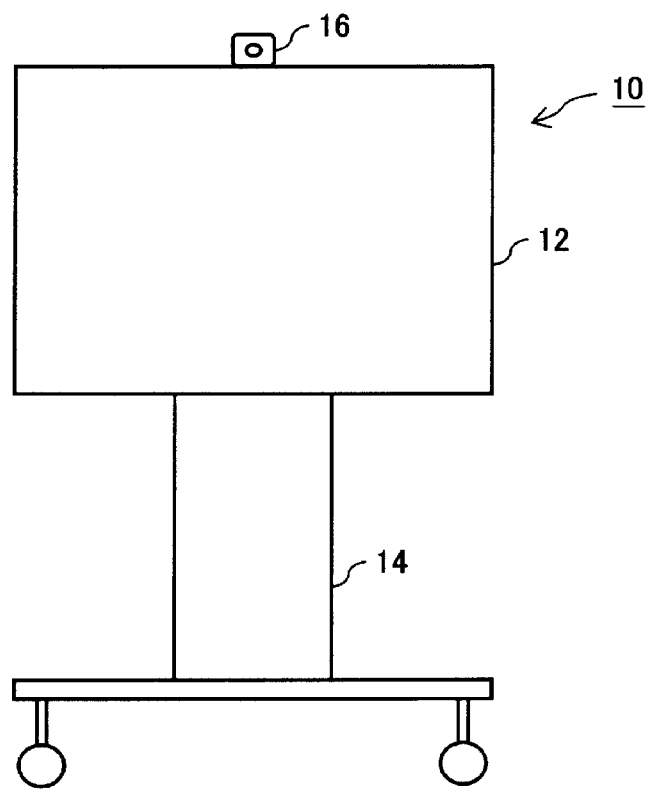
FIGS. 1A and 1B are respectively a front view and a side view of a display device.
Figure 1B:
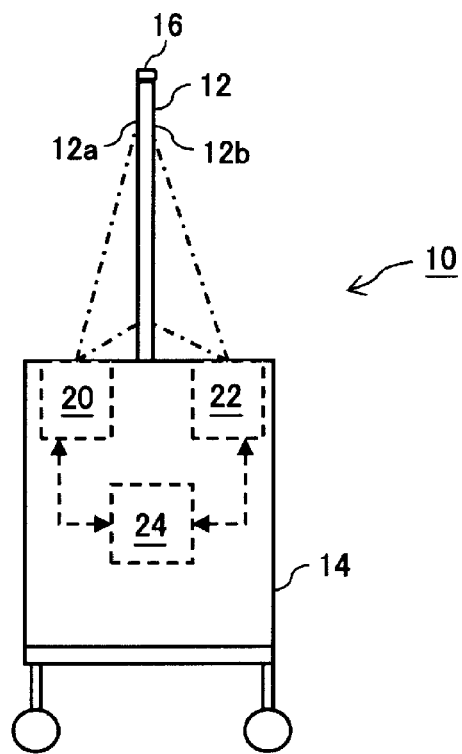

FIGS. 1A and 1B are respectively a front view and a side view of a display device 10 according to the exemplary embodiment.

The display device 10 includes a screen 12, a body 14, and a sensor 16. The display device 10 is movable as a result of being attached to legs on casters, for example.

The screen 12 has a first surface 12a and a second surface 12b and is a so-called double-sided screen to display images on both of the first and second surfaces 12a and 12b. If the first surface 12a is a front surface and the second surface 12b is a rear surface, images are displayed on both of the front and rear surfaces.

The body 14 supports the screen 12 so that the screen 12 can be fixed. The body 14 includes two projectors 20 and 22 and a processor 24. The processor 24 controls the operations of the projectors 20 and 22.

The projector 20 is disposed in the upper side of the body 14 and on the bottom side of the first surface 12a of the screen 12. The distance from the projector 20 to the screen 12 is determined by considering the focal length of the projector 20. The projector 20 is a rear projector and projects an image onto the screen 12.

The projector 22 is disposed in the upper side of the body 14 and on the bottom side of the second surface 12b of the screen 12. The distance from the projector 22 to the screen 12 is also determined by considering the focal length of the projector 22. The projector 22, as well as the projector 20, is a rear projector and projects an image onto the screen 12.

The projectors 20 and 22 are formed as ultra-short focus projectors so that the distance between the screen 12 and the projectors 20 and 22 can be decreased, thereby reducing the size of the body 14.

The processor 24 controls the operations of the projectors 20 and 22 so that the projectors 20 and 22 will project images on the first and second surfaces 12a and 12b. The processor 24 turns ON the projector 20 so that an image can be projected on the screen 12 and be viewed from the second surface 12b (rear projection). The processor 24 also turns ON the projector 22 so that an image can be projected on the screen 12 and be viewed from the first surface 12a (rear projection). When the projector 20 is turned ON, a person on the side of the second surface 12b of the screen 12 views a horizontally non-inverted image. When the projector 22 is turned ON, a person on the side of the first surface 12a of the screen 12 views a horizontally non-inverted image.

The processor 24 controls the switching of the ON/OFF operations between the projectors 20 and 22 and turns ON the projectors 20 and 22 mutually exclusively. That is, at one timing, the processor 24 turns ON the projector 20 so that a horizontally non-inverted image will be projected as viewed from the second surface 12b. At another timing, the processor 24 turns ON the projector 22 so that a horizontally non-inverted image will be projected as viewed from the first surface 12a.

The sensor 16 monitors a predetermined area on the side of the first surface 12a and that of the second surface 12b so as to detect a person on the side of the first surface 12a and a person on the side of the second surface 12b. Upon detecting a person, the sensor 16 supplies a detection signal to the processor 24. By using a detection signal supplied from the sensor 16, the processor 24 controls the switching of the ON/OFF operations between the projectors 20 and 22 and executes various processing operations.

Although in this exemplary embodiment the projectors 20 and 22 are rear projectors, they may be front projectors. In this case, the processor 24 turns ON the projector 20 so that a person on the side of the first surface 12a of the screen 12 can view a horizontally non-inverted image, while the processor 24 turns ON the projector 22 so that a person on the side of the second surface 12b of the screen 12 can view a horizontally non-inverted image.

Although in this exemplary embodiment two projectors 20 and 22 are provided, they may be combined into one projector. In this case, the single projector functions as a front projector at one timing and functions as a rear projector at another timing. For example, a single projector is disposed at a position at which the projector 20 is disposed, that is, on the bottom side of the first surface 12a of the screen 12. At one timing, the processor 24 causes the projector to function as a front projector to project an image on the screen 12 so that a person on the side of the first surface 12a can view a horizontally non-inverted image. At another timing, the processor 24 causes the projector to function as a rear projector to project an image on the screen 12 so that a person on the side of the second surface 12b can view a horizontally non-inverted image.

Figure 2A:
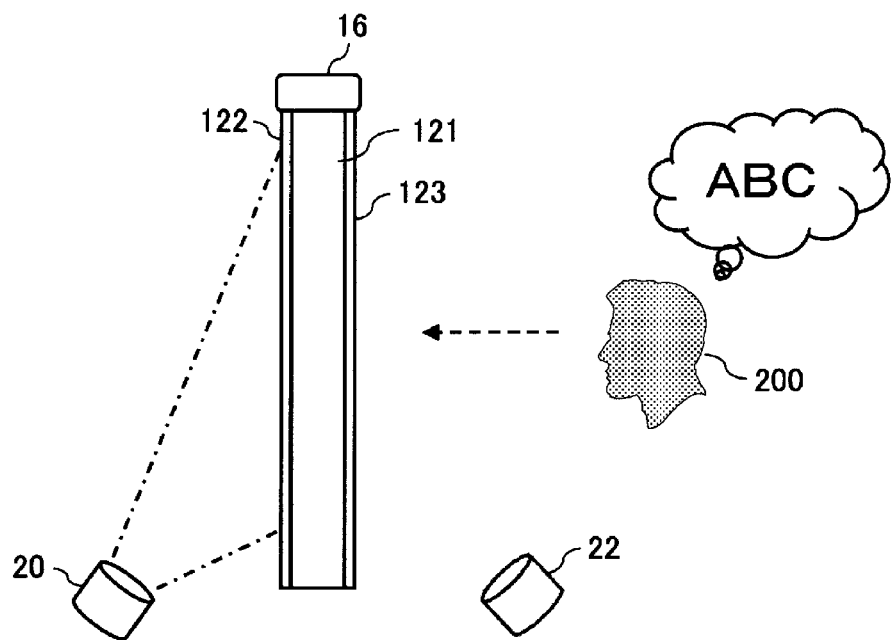
FIGS. 2A and 2B are schematic views for explaining switching of image projection by using two projectors.
Figure 2B:
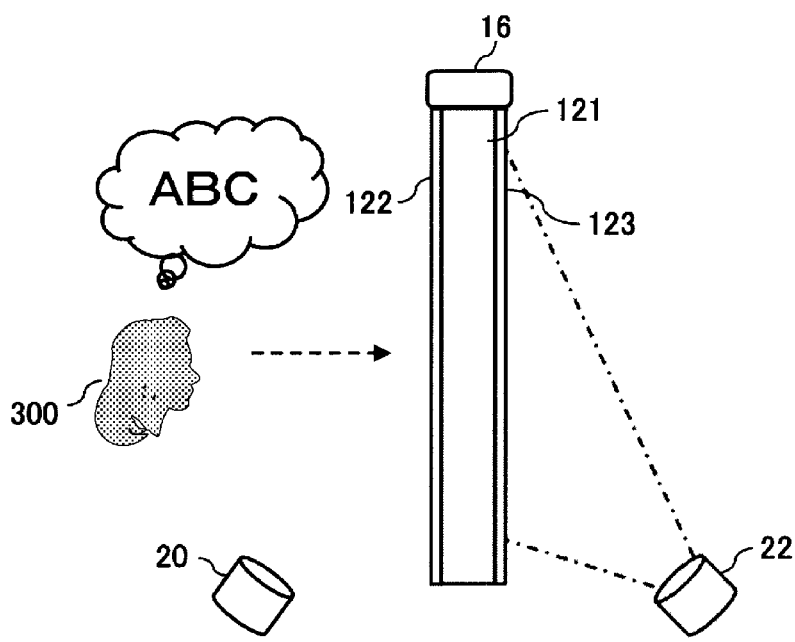

FIGS. 2A and 2B schematically illustrate the configuration of the screen 12 of the display device 10 and also illustrate the display state of images on the first and second surfaces 12a and 12b.

The screen 12 includes a transparent substrate 121 made of glass or an acrylic material, for example. A diffusion coating 122 is formed on the transparent substrate 121 on the side of the first surface 12a, while a diffusion coating 123 is formed on the transparent substrate 121 on the side of the second surface 12b. Instead of the diffusion coating 122, a diffusion film or a diffusion sheet may be attached to the transparent substrate 121 on the side of the first surface 12a, while, instead of the diffusion coating 123, a diffusion film or a diffusion sheet may be attached to the transparent substrate 121 on the side of the second surface 12b.

A polarizing film, a Fresnel lens, and a lenticular lens sheet are known as a diffusion film or a diffusion sheet used for rear projection. The screen 12 in this exemplary embodiment is desirably a transparent screen which can be seen through, and thus, a diffusion film containing a transparent resin binder and light scattering particles having a refractive index different from the refractive index of the transparent resin binder may be used. As the transparent resin binder, a transparent resin containing at least one of acrylate, styrene, polycarbonate, polystyrene terephthalate, and acrylonitrile as a principal component, or a reactive resin such as an epoxy acrylate resin or a urethane acrylate resin may be used. As the light scattering particles, crosslinked particles polymerized with monomers such as methacrylate and styrene or crosslinked urethane particles may be used. Alternatively, a diffusion film including light transmitting portions and light diffusion portions which are alternately formed may be used.

The diffusion coating 122 diffuses an image projected by the projector 20 and allows a person 200 on the side of the second surface 12b of the screen 12 to view a horizontally non-inverted image. For example, the projector 20 projects an image "ABC", and then, the person 200 on the side of the second surface 12b can recognize "ABC" as a horizontally non-inverted image, as shown in FIG. 2A.

The diffusion coating 123 diffuses an image projected by the projector 22 and allows a person 300 on the side of the first surface 12a of the screen 12 to view a horizontally non-inverted image. For example, the projector 22 projects an image "ABC", and then, the person 300 on the side of the first surface 12a can recognize "ABC" as a horizontally non-inverted image, as shown in FIG. 2B.

The image display state when the screen 12 is a transparent screen will be discussed. When the projector 20 is turned ON to project an image on the diffusion coating 122, the person 200 on the side of the second surface 12b views a horizontally non-inverted image, as shown in FIG. 2A. In this state, if someone is present on the side of the first surface 12a, this person sees a horizontally inverted image. Likewise, when the projector 22 is turned ON to project an image on the diffusion coating 123, the person 300 on the side of the first surface 12a views a horizontally non-inverted image, as shown in FIG. 2B. In this state, if someone is present on the side of the second surface 12b, this person sees a horizontally inverted image. Accordingly, by using a detection signal from the sensor 16, the processor 24 controls the switching of the ON/OFF operations between the projectors 20 and 22 in accordance with various conditions. Examples of the conditions are the one concerning whether someone is present on the side of the first surface 12a or the second surface 12b of the screen 12 and the one concerning whether someone is present both on the sides of the first and second surfaces 12a and 12b.

Figure 3A:
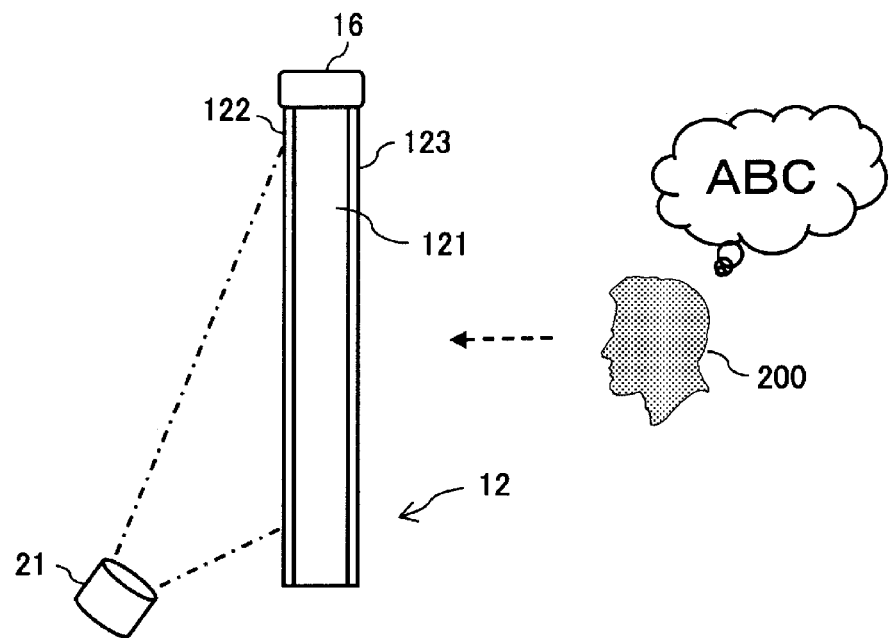
FIGS. 3A and 3B are schematic views for explaining switching of image projection by using one projector.
Figure 3B:
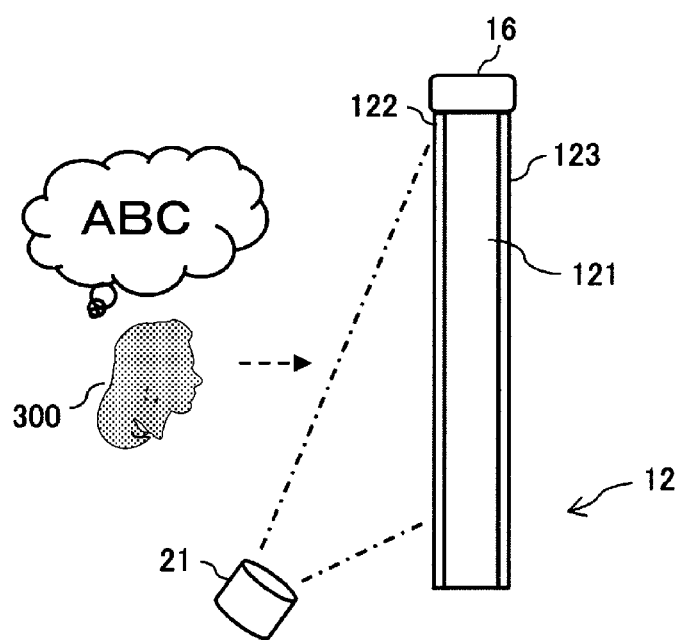

FIGS. 3A and 3B illustrate a state in which the processor 24 controls the switching of the function of a single projector 21 between a rear projector and a front projector. The projector 21 is disposed on the side of the first surface 12a of the screen 12, for example.

At one timing, the processor 24 operates the projector 21 as a rear projector to project an image on the diffusion coating 122 of the screen 12 so that the person 200 on the side of the second surface 12b can view a horizontally non-inverted image. For example, the projector 21 projects an image "ABC", and then, the person 200 on the side of the second surface 12b of the screen 12 can recognize a horizontally non-inverted image "ABC", as shown in FIG. 3A.

At another timing, the processor 24 operates the projector 21 as a front projector to project an image on the diffusion coating 122 of the screen 12 so that the person 300 on the side of the first surface 12a can view a horizontally non-inverted image. For example, the projector 21 projects an image "ABC", and then, the person 300 on the side of the first surface 12a of the screen 12 can recognize a horizontally non-inverted image "ABC", as shown in FIG. 3B.

In FIGS. 3A and 3B, the projector 21 projects an image on the diffusion coating 122 regardless of whether the projector 21 operates as a rear projector or as a front projector. However, the projector 21 may project an image on the diffusion coating 123 when it operates as a rear projector and project an image on the diffusion coating 122 when it operates as a front projector. Conversely, the projector 21 may project an image on the diffusion coating 122 when it operates as a rear projector and project an image on the diffusion coating 123 when it operates as a front projector. Although in FIGS. 2A through 3B both of the diffusion coatings 122 and 123 are formed on the transparent substrate 121, at least one of the diffusion coatings 122 and 123 may be formed on or attached to the transparent substrate 121.

The display device 10 is a device which functions as a tool for connecting people sharing the same interest. The display device 10 has the function of detecting people interested in certain information and the function of enhancing smooth communication between people sharing the same interest. The function of detecting people interested in certain information is achieved as a result of the sensor 16 detecting people viewing an image (information) displayed on the screen 12. The function of enhancing smooth communication between people sharing the same interest is achieved by changing the display mode of an image displayed on the screen 12 in accordance with the detection result of people. These functions will be discussed below.

[Detection of People]

Figure 4A:
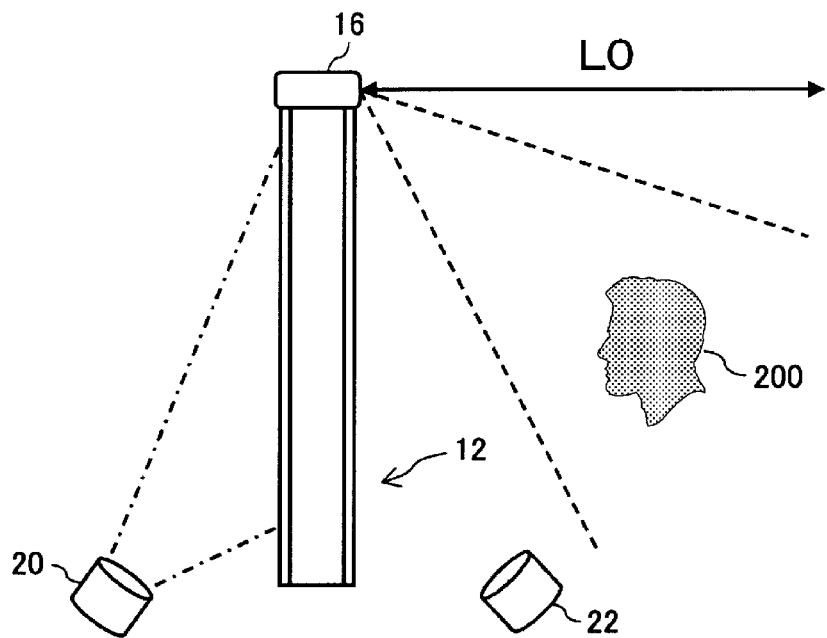
FIGS. 4A and 4B are schematic views for explaining the detection of people by using a sensor.
Figure 4B:
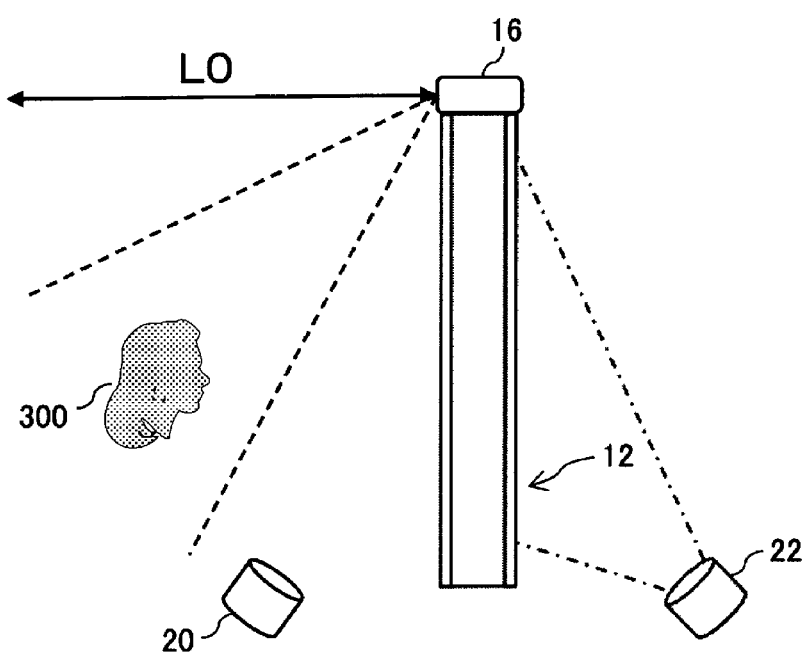

FIGS. 4A and 4B schematically illustrate the detecting of people by the sensor 16. The sensor 16 includes a camera (first camera) which detects a person on the side of the first surface 12a of the screen 12 and a camera (second camera) which detects a person on the side of the second surface 12b of the screen 12. The detection area of the first and second cameras is a range within a predetermined distance L0 from the screen 12.

FIG. 4A illustrates the detecting of the person 200 on the side of the second surface 12b of the screen 12 by the second camera when a horizontally non-inverted image is being projected on the second surface 12b. The second camera detects that the person 200 is present within the predetermined distance L0 from the screen 12 and supplies a detection signal to the processor 24. By using the detection signal from the second camera, the processor 24 detects whether the person 200 is viewing the image projected on the screen 12 based on the face direction and the eye direction of the person 200, for example.

FIG. 4B illustrates the detecting of the person 300 on the side of the first surface 12a of the screen 12 by the first camera when a horizontally non-inverted image is being projected on the first surface 12a. The first camera detects that the person 300 is present within the predetermined distance L0 from the screen 12 and supplies a detection signal to the processor 24. By using the detection signal from the first camera, the processor 24 detects whether the person 300 is viewing the image projected on the screen 12 based on the face direction and the eye direction of the person 300, for example.

In FIGS. 4A and 4B, the detection distance of the first camera and that of the second camera are the same, that is, the predetermined distance L0 is used. However, the detection distance of the first camera and that of the second camera may be different. For example, if the first surface 12a is a front surface and the second surface 12b is a rear surface, the detection distance of the first camera may be longer than that of the second camera. The predetermined distance L0 may not necessarily be fixed and may be varied in accordance with the detection result of people.

Figure 5:
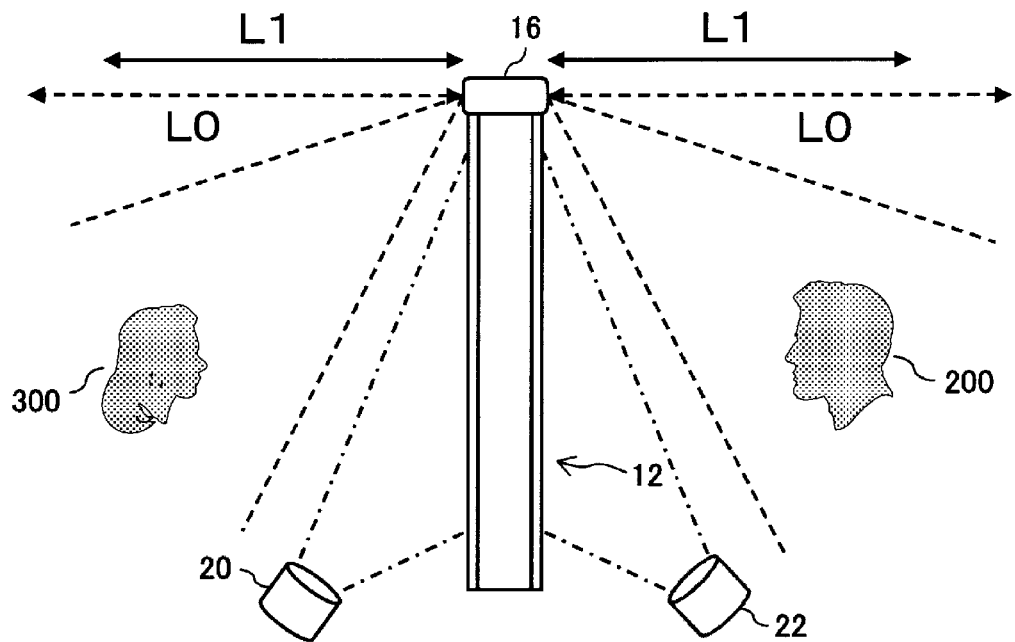
FIG. 5 is a schematic view for explaining the detection of people by using a sensor.

FIG. 5 schematically illustrates a state in which the detection distance of the first and second cameras is variable. When the projector 20 is turned ON and a horizontally non-inverted image is being projected on the second surface 12b of the screen 12, if the person 200 is detected by the second camera, the processor 24 changes the detection distance of the first camera from L0 to L1 (L0>L1). The reason for this is to exclude a person on the side of the first surface 12a positioned farther away from the screen 12 than the detected person 200 from the screen 12. Likewise, when the projector 22 is turned ON and a horizontally non-inverted image is being projected on the first surface 12a of the screen 12, if the person 300 is detected by the first camera, the processor 24 changes the detection distance of the second camera from L0 to L1 (L0>L1). When the detection distance is variable, the degree by which the detection distance of the first camera is changed may be different from that of the second camera. Note that the detection result of the first camera changes the detection distance of the second camera, and the detection result of the second camera changes the detection distance of the first camera.

The processor 24 detects the presence of people by using the first and second cameras forming the sensor 16, and also estimates how much a detected person shows an interest in an image (information) projected on the screen 12. This will hereinafter be called "the level of interest". To estimate the level of interest of a detected person, the processor 24 progressively changes what to look for in a detected person in accordance with the distance between the detected person and the screen 12.

Figure 6:
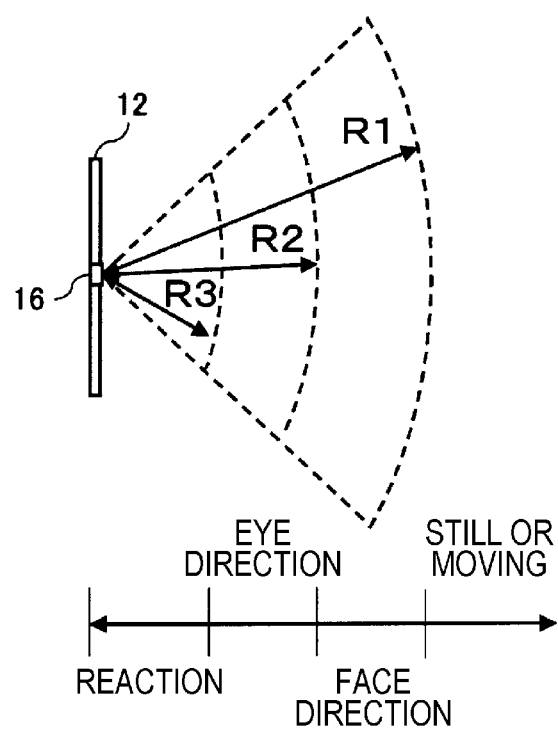
FIG. 6 is a plan view for explaining detection distance zones.

FIG. 6 is a plan view of the display device 10 illustrating the relationship between the distance from a detected person to the screen 12 and what to look for in the detected person. FIG. 6 shows the detection area of the second camera on the side of the second surface 12b. However, the above-described relationship on the side of the first surface 12a is similar to that shown in FIG. 6.

The processor 24 divides the detection distance (L0 or L1) into plural zones according to the distance from the screen 12. For example, the processor 24 divides the detection distance into the following four zones by using threshold distances R1, R2, and R3 (R1>R2>R3).

(1) First zone: the distance is R1 or greater
(2) Second zone: the distance is R2 or greater but smaller than R1
(3) Third zone: the distance is R3 or greater but smaller than R2
(4) Fourth zone: the distance is smaller than R3

When the second camera has detected the person 200 within the first zone, the processor 24 determines whether the person 200 is still or moving. If the person 200 is still, the processor 24 determines that the person 200 is likely to view the screen 12 and judges that the person 200 may be interested in an image on the screen 12. If the person 200 is moving, the processor 24 determines that the person 200 is not likely to view the screen 12 and judges that the person 200 may not be interested in the image on the screen 12. When the second camera has detected the person 200 within the second zone, the processor 24 detects the face direction of the person 200 and estimates the level of interest of the person 200 in accordance with the face direction. Typically, if the face direction of the person 200 faces the screen 12, the processor 24 estimates the level of interest of the person 200 for the image (information) on the screen 12 at a relatively high level, and if the face direction of the person 200 does not face the screen 12, the processor 24 estimates the level of interest of the person 200 at a relatively low level. When the second camera has detected the person 200 within the third zone, the processor 24 detects the eye direction of the person 200 and estimates the level of interest of the person 200 in accordance with the eye direction. Typically, if the detected eye direction shows that the person 200 is looking at an image (information) on the screen 12, the processor 24 estimates the level of interest of the person 200 at a relatively high level. If the detected eye direction shows that the person 200 is not looking at an image (information) on the screen 12, the processor 24 estimates the level of interest of the person 200 at a relatively low level. When the second camera has detected the person 200 within the fourth zone, the processor 24 detects whether the person 200 has showed some reaction for the image (information) displayed on the screen 12 and estimates the level of interest of the person 200 in accordance with the detection result. Typically, if the person 200 has showed some reaction, the processor 24 estimates the level of interest of the person 200 for the image (information) at a relatively high level and changes the display state of the image in accordance with the reaction. Examples of the reaction of the person 200 are making a specific gesture and saying something (voice). Alternatively, the second surface 12b of the screen 12 may be formed as a touch panel, and the processor 24 may detect whether the person 200 has touched the second surface 12b of the screen 12.

While the projectors 20 and 22 are turned ON only mutually exclusively, the first and second cameras of the sensor 16 are constantly turned ON to detect the presence of people. For example, when the projector 20 is turned ON and a horizontally non-inverted image is being projected on the second surface 12b of the screen 12, the second camera detects the person 200 on the side of the second surface 12b, and, at the same time, the first camera detects the person 300 on the side of the first surface 12a. Likewise, when the projector 22 is turned ON and a horizontally non-inverted image is being projected on the first surface 12a of the screen 12, the first camera detects the person 300 on the side of the first surface 12a, and, at the same time, the second camera detects the person 200 on the side of the second surface 12b. The processor 24 controls the switching of the ON/OFF operations between the projectors 20 and 22 to change the display state of an image on the screen 12 in accordance with the detection results of the persons 200 and 300.

Changing of the image display state by the processor 24 will be discussed below.

[Changing of Image Display State]

Figure 7A:
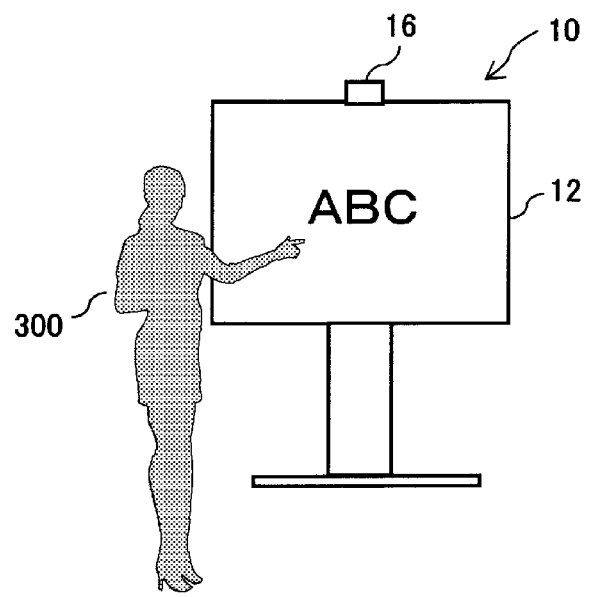
FIGS. 7A and 7B are schematic views for explaining the projecting of the same image on a screen.
Figure 7B:
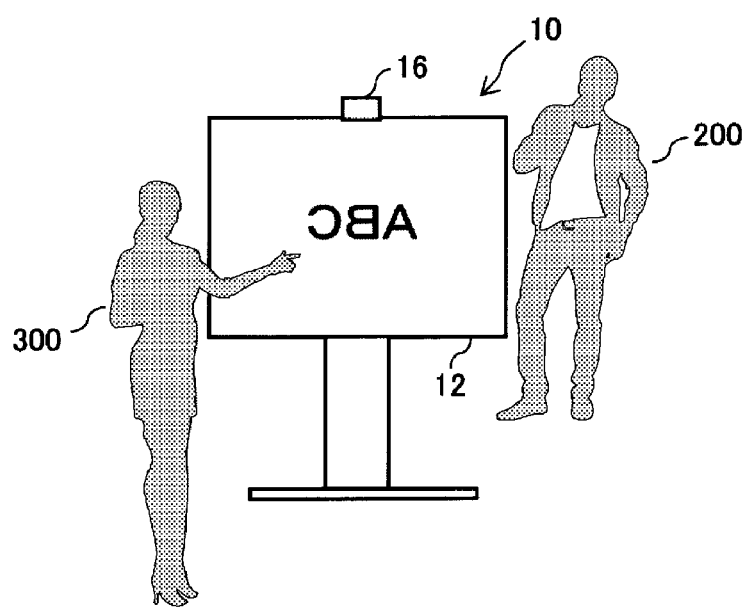

FIGS. 7A and 7B illustrate an example of image display control performed by the processor 24 in accordance with a detection result of the sensor 16. The processor 24 first turns OFF the projector 20 and turns ON the projector 22 to project a horizontally non-inverted image on the first surface 12a of the screen 12. The image is "ABC", for example.

When the person 300 on the side of the first surface 12a of the screen 12 views this image, the first camera of the sensor 16 detects the person 300. If the person 300 is positioned within the first zone, the processor 24 determines whether the person 300 is still or moving. If the person 300 is positioned within the second zone, the processor 24 detects the face direction of the person 300. If the person 300 is positioned within the third zone, the processor 24 detects the eye direction of the person 300. If the person 300 is positioned within the fourth zone, the processor 24 determines whether the person 300 has showed some reaction for the image displayed on the screen 12.

When the first camera has detected the person 300 and when the second camera has not detected anyone, the processor 24 continues to turn ON the projector 22 to project a horizontally non-inverted image on the first surface 12a. Alternatively, even if the second camera does not detect anyone, after the lapse of a predetermined time, the processor 24 may turn ON the projector 20 and turn OFF the projector 22 to project a horizontally non-inverted image on the second surface 12b. In this case, the person 300 on the side of the first surface 12a sees a horizontally inverted image, as discussed above. Alternatively, the processor 24 may control the ON/OFF operations between the projectors 20 and 22 in the following manner, for example, in accordance with the zone within which the person 300 is detected.

(a) When the Person 300 is Positioned within the First Zone

The processor 24 switches the ON/OFF operations between the projectors 20 and 22 by using a time T1. More specifically, the processor 24 turns ON the projector 22 and turns OFF the projector 20 for a certain period of the time T1, and turns OFF the projector 22 and turns ON the projector 20 for the subsequent period of the time T1.

(b) When the Person 300 is Positioned within the Second Zone or the Third Zone

The processor 24 turns ON the projector 22 and turns OFF the projector 20 for a period of a time T2 (T2>T1), and turns OFF the projector 22 and turns ON the projector 20 for the subsequent period of the time T1. That is, when the person 300 is positioned within the second zone or the third zone, the period for which the projector 22 is ON is set to be relatively long so as to increase the time for the person 300 to view a horizontally non-inverted image. The processor 24 may change the period for which the projector 22 is ON in accordance with the level of interest of the person 300 estimated in accordance with the face direction of the person 300 in the second zone or the eye direction of the person 300 in the third zone. Typically, as the level of interest I is higher, the period of time T for which the projector 22 is ON is increased. More specifically, if the person 300 is positioned in the second zone and directs the face toward the screen 12, the processor 24 sets the period for which the projector 22 is ON to be relatively long so as to increase the time for which the person 300 can view the horizontally non-inverted image. If the person 300 is positioned in the second zone but does not direct the face toward the screen 12, the processor 24 sets the period for which the projector 22 is ON to be relatively short so as to decrease the time for which the person 300 can view the horizontally non-inverted image.

(c) When the Person 300 is Positioned within the Fourth Zone

Unless the second camera detects the person 200, the processor 24 continues to turn ON the projector 22 and turn OFF the projector 20. This encourages the person 300 to show some reaction for the image displayed on the screen 12. When the second camera has detected the person 200, the processor 24 turns OFF the projector 22 and turns ON the projector 20.

FIG. 7A illustrates a state in which the projector 22 is turned ON as a result of the first camera detecting the person 300 and a horizontally non-inverted image is being projected on the first surface 12a of the screen 12. FIG. 7B illustrates a state in which the projector 22 is turned OFF and the projector 20 is turned ON as a result of the second camera detecting the person 200 in the state shown in FIG. 7A, and a horizontally non-inverted image is being projected on the second surface 12b of the screen 12. In FIG. 7B, the person 300 on the side of the first surface 12a views the horizontally inverted image of the image "ABC", that is, the image "ABC" viewed from the back side.

Upon detecting both of the persons 200 and 300, the processor 24 switches the ON/OFF operations between the projectors 20 and 22 in the following manner, for example, in accordance with the zones within which the persons 200 and 300 are positioned and the levels of interest of the persons 200 and 300.

(d) When the Persons 200 and 300 are Positioned within the Same Zone

The processor 24 switches the ON/OFF operations between the projectors 20 and 22 by using a time T3 (T3=T1 or T3<T1). More specifically, the processor 24 turns ON the projector 22 and turns OFF the projector 20 for a period of the time T3, and turns OFF the projector 22 and turns ON the projector 20 for the subsequent period of the time T3. Even when the persons 200 and 300 are both positioned within the second zone or the third zone, if the level of interest of the person 200 and that of the person 300 are different, the processor 24 may switch the ON/OFF operations between the projectors 20 and 22 in accordance with the levels of interest of the persons 200 and 300. For example, if the level of interest of the person 300 is higher than that of the person 200, the processor 24 may set the period for which the projector 22 is ON to be longer than that for which the projector 20 is ON.

If the persons 200 and 300 are both positioned within the fourth zone, the processor 24 switches the ON/OFF operations between the projectors 20 and 22 in accordance with the reaction of the persons 200 and 300. If the person 200 says "display on this side" or makes a gesture to turn over the screen 12, the processor 24 turns ON the projector 20 and turns OFF the projector 22. If the person 300 touches the screen 12, the processor 24 turns ON the projector 22 and turns OFF the projector 20.

As discussed above, the screen 12 is a transparent screen which can be seen through, and a person on one side of the screen 12 can see an image on the screen 12 and also see the other side of the screen 12. That is, the person 300 can see an image displayed on one side of the screen 12 and also see the person 200 on the other side of the screen 12. Likewise, the person 200 can see an image on one side of the screen 12 and also see the person 300 on the other side of the screen 12. This facilitates communication between the persons 200 and 300 by means of an image on the screen 12 so as to connect the persons 200 and 300 naturally.

(e) When the Persons 200 and 300 are Positioned within Different Zones

The processor 24 controls the ON/OFF periods of the projectors 20 and 22 so that a horizontally non-inverted image can be projected for a longer time on the side on which the zone within which a person is positioned is closer to the screen 12. For example, when the person 200 is positioned within the first zone and the person 300 is positioned within the second zone, the processor 24 sets the ON period of the projector 22 to be relatively long and sets the ON period of the projector 20 to be relatively short. When the person 200 is positioned within the second zone and the person 300 is positioned within the third zone, the processor 24 sets the ON period of the projector 22 to be relatively long and sets the ON period of the projector 20 to be relatively short. The processor 24 may make further adjustment to the ON periods of the projectors 20 and 22 in accordance with the levels of interest of the persons 200 and 300. For example, when the person 200 is positioned within the first zone and the person 300 is positioned within the second zone, the processor 24 basically sets the ON period of the projector 22 to be relatively long and sets the ON period of the projector 20 to be relatively short. However, if the person 200 faces the screen 12 and the level of interest of the person 200 is found to be relatively high, the processor 24 may make further adjustment to increase the ON period of the projector 20.

When the persons 200 and 300 are positioned within different zones, as well as they are positioned within the same zone, the person 300 can see an image displayed on one side of the screen 12 and also see the person 200 on the other side of the screen 12. Likewise, the person 200 can see an image displayed on one side of the screen 12 and also see the person 300 on the other side of the screen 12. This facilitates communication between the persons 200 and 300 by means of an image on the screen 12 so as to connect the persons 200 and 300 naturally.

The processor 24 controls the switching of the ON/OFF operations between the projectors 20 and 22 in accordance with the zone within which a person is positioned and the level of interest of this person. However, the processor 24 may control the switching of the ON/OFF operations between the projectors 20 and 22 only in accordance with the level of interest of a person regardless of the zone. More specifically, the processor 24 estimates the levels of interest of people by using at least one of the face direction and the eye direction. The processor 24 then switches the ON/OFF operations between the projectors 20 and 22 so that a horizontally non-inverted image will be projected for a relatively long time for the person having a higher level of interest. If, instead of the projectors 20 and 22, the single projector 21 is used and is disposed at the position of the projector 20, the processor 24 controls the operation of the projector 21 in a similar manner. Turning ON the projector 22 will be replaced by operating the projector 21 as a front projector, while turning ON the projector 20 will be replaced by operating the projector 21 as a rear projector.

In FIGS. 7A and 7B, the projectors 20 and 22 project the same image "ABC" on the screen 12. The projectors 20 and 22 may project different images on the screen 12. For example, the projector 20 projects an image "ABC", while the projector 22 projects an image "あいう".

Figure 8A:
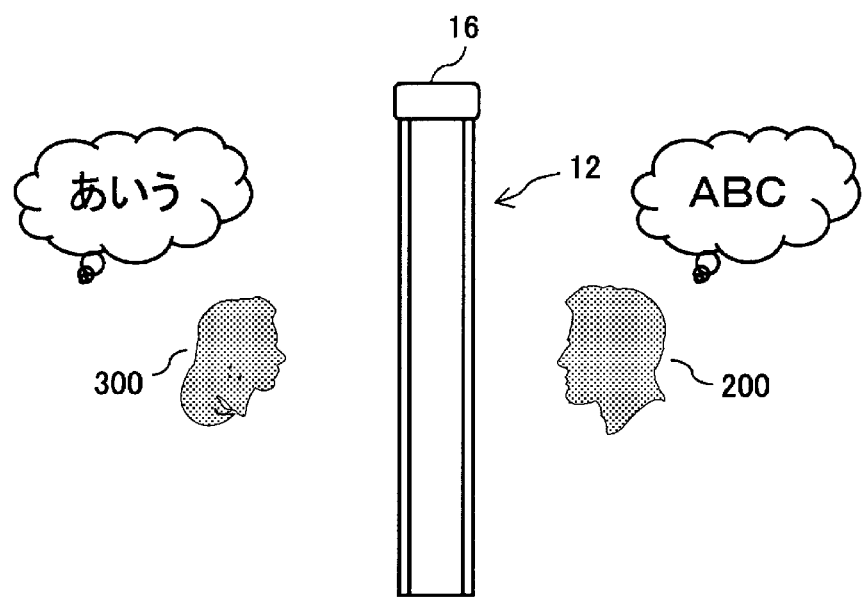
FIGS. 8A and 8B are schematic views for explaining the projecting of different images on a screen.
Figure 8B:
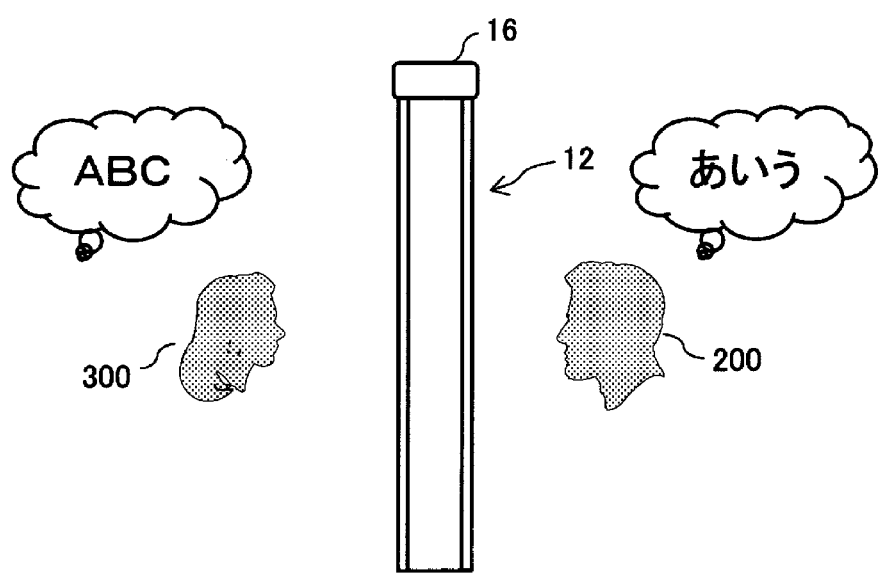

FIGS. 8A and 8B illustrate a state in which the projectors 20 and 22 display different images. In FIG. 8A, at one timing, the processor 24 turns ON the projector 20 to project an image "ABC" on the second surface 12b of the screen 12. The person 200 on the side of the second surface 12b views a horizontally non-inverted image "ABC". At another timing, the processor 24 turns on the projector 22 to project an image "あいう" on the first surface 12a of the screen 12. The person 300 on the side of the first surface 12a views a horizontally non-inverted image "あいう". If the image on the front side of a document is "ABC", while the image on the back side of the document is "あいう", the person 200 views the image on the front side of the document, while the person 300 views the image on the back side of the same document.

Then, as shown in FIG. 8B, after the lapse of a predetermined time or in accordance with the reaction (gesture, voice, or touch operation) of the person 200 or 300, the processor 24 exchanges the image projected by the projector 20 and that by the projector 22 for each other. That is, at one timing, the processor 24 turns ON the projector 20 to project the image "あいう" on the second surface 12b of the screen 12. The person 200 on the side of the second surface 12b views a horizontally non-inverted image "あいう". At another timing, the processor 24 turns ON the projector 22 to project the image "ABC" on the first surface 12a of the screen 12. The person 300 on the side of the first surface 12a views a horizontally non-inverted image "ABC". The person 200 views the horizontally non-inverted image "ABC" first and then sequentially views the horizontally non-inverted image "あいう", that is, the person 200 views the image on the front side first and then sequentially views the image on the back side. The person 300 views the horizontally non-inverted image "あいう" first and then sequentially views the horizontally non-inverted image "ABC", that is, the person 300 views the image on the back side first and then sequentially views the image on the front side. In short, the persons 200 and 300 view the image on the front side and the image on the back side of the same document alternately. This facilitates communication between the persons 200 and 300 by means of these images.

As described above, the processor 24 changes the display state of an image on the screen 12 by switching the ON/OFF operations between the projectors 20 and 22 in accordance with whether someone is detected and the level of interest of a detected person. The processor 24 may also switch the ON/OFF operations between the projectors 20 and 22 in accordance with the number of detected people. Changing of the image display state in accordance with the number of people by the processor 24 will be discussed below.

[Changing of Image Display State in accordance with the Number of People]

Figure 9A:
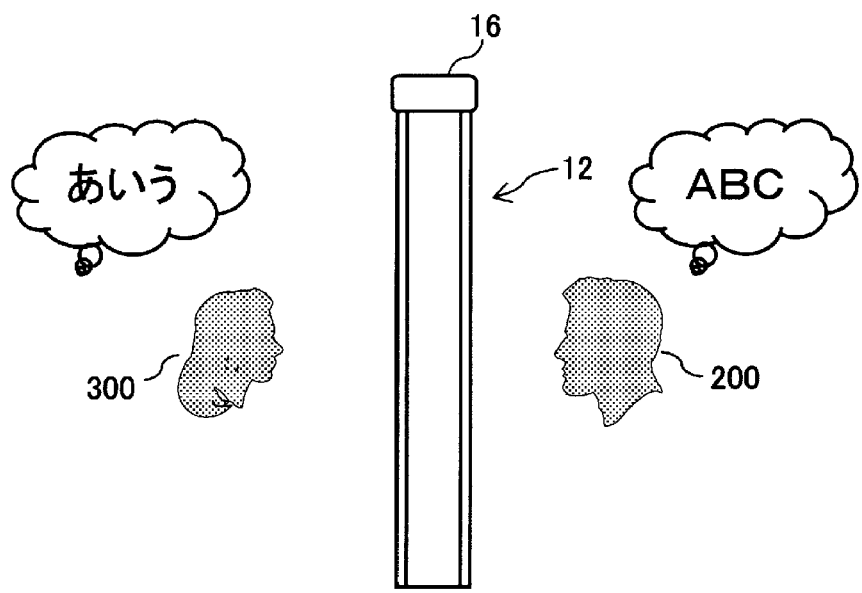
FIGS. 9A and 9B are schematic views for explaining projecting of images on a screen in accordance with the number of detected people.
Figure 9B:
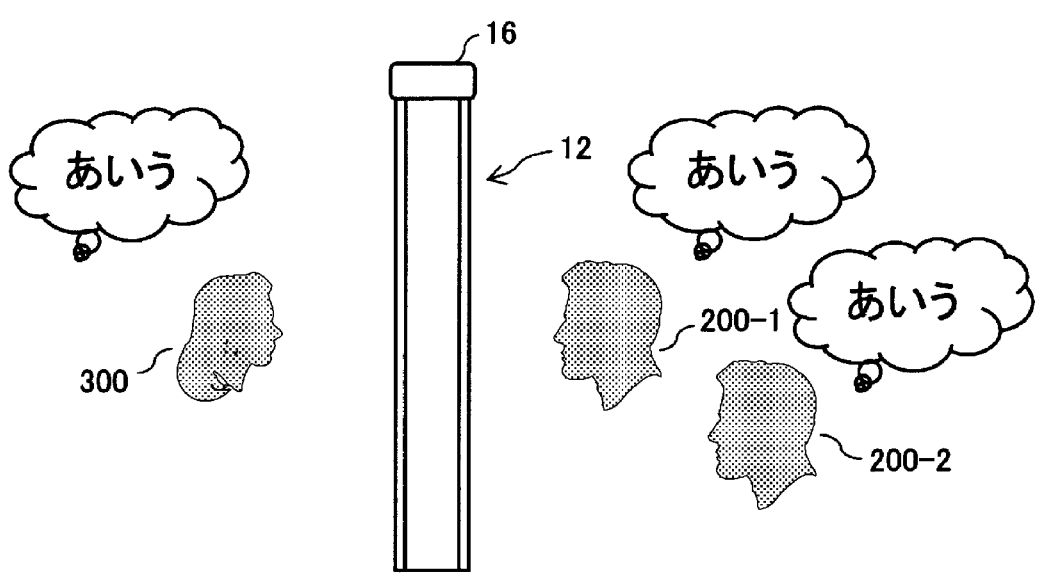

FIGS. 9A and 9B illustrate a state in which an image is displayed in accordance with the number of detected people. In FIG. 9A, at one timing, the processor 24 turns ON the projector 20 to project an image "ABC" on the second surface 12b of the screen 12. The person 200 on the side of the second surface 12b views a horizontally non-inverted image "ABC". At another timing, the processor 24 turns ON the projector 22 to project an image "あいう" on the first surface 12a of the screen 12. The person 300 on the side of the first surface 12a views a horizontally non-inverted image "あいう". If the image on the front side of a document is "ABC", while the image on the back side of the document is "あいう", the person 200 views the image on the front side of the document, while the person 300 views the image on the back side of the same document.

After the lapse of a predetermined time, the processor 24 is supposed to exchange the image projected by the projector 20 and that by the projector 22 for each other, as shown in FIG. 8B. That is, at one timing, the processor 24 would turn ON the projector 20 to project the image "あいう" on the second surface 12b of the screen 12, and the person 200 on the side of the second surface 12b would view a horizontally non-inverted image "あいう". At another timing, the processor 24 would turn ON the projector 22 to project the image "ABC" on the first surface 12a of the screen 12, and the person 300 on the side of the first surface 12a would view a horizontally non-inverted image "ABC". However, if the second camera of the sensor 16 detects two persons 200-1 and 200-2 on the side of the second surface 12b of the screen 12, the processor 24 turns ON the projector 22 to project the image "あいう" instead of the image "ABC" on the first surface 12a of the screen 12. In this case, the person 300 continues to view the image "あいう". In short, the processor 24 projects a horizontally non-inverted image preferentially on the side with more people over the side with fewer people. That is, the processor 24 displays the same image as that on the side with more people on the side with fewer people. As a result, the person 300 views the same image as that viewed by the persons 200-1 and 200-2, thereby promoting communication between the persons 200-1 and 200-2 and the person 300.

As well as when the projectors 20 and 22 project different images, when they project the same image, the ON/OFF operations between the projectors 20 and 22 may be switched in accordance with the number of people. More specifically, if, as shown in FIG. 9B, more people are found on the side of the second surface 12b of the screen 12 than that on the side of the first surface 12a, the processor 24 may set the period for which the projector 20 is turned ON to be longer than that for which the projector 22 is turned ON.

[Changing of Visibility]

As discussed above, the screen 12 is a transparent screen which can be seen through. However, with the application of a voltage, the screen 12 may be switched between the transparent or translucent state in which a person is able to see the other side of the screen and the opaque state in which a person is unable to see the other side of the screen. This can switch the visibility for a person on one side of the screen 12 with respect to a person on the other side of the screen 12, thereby promoting communication between people.

Figure 10A:
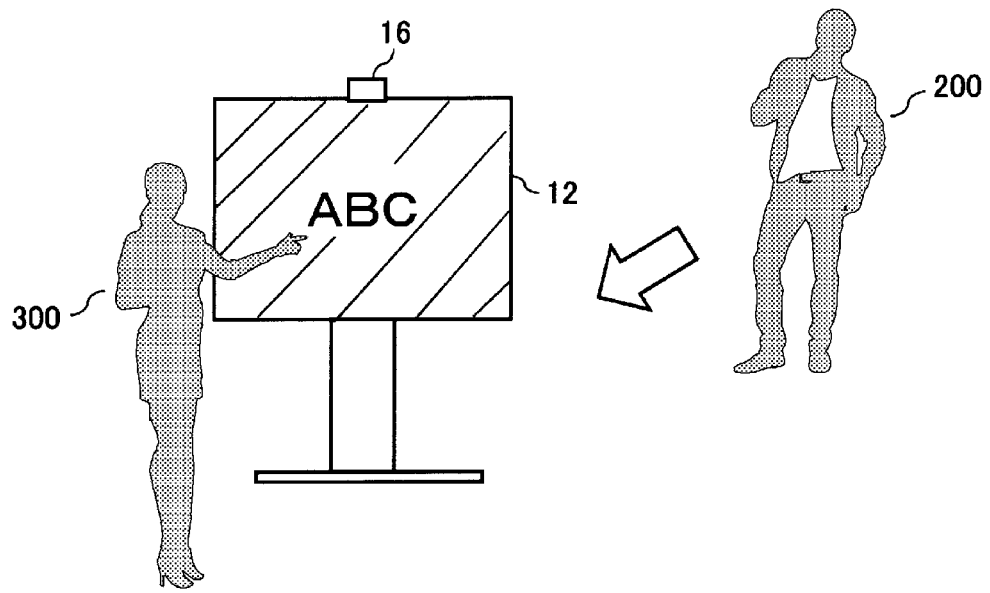
FIGS. 10A and 10B are schematic views for explaining changing of the visibility of a screen.
Figure 10B:
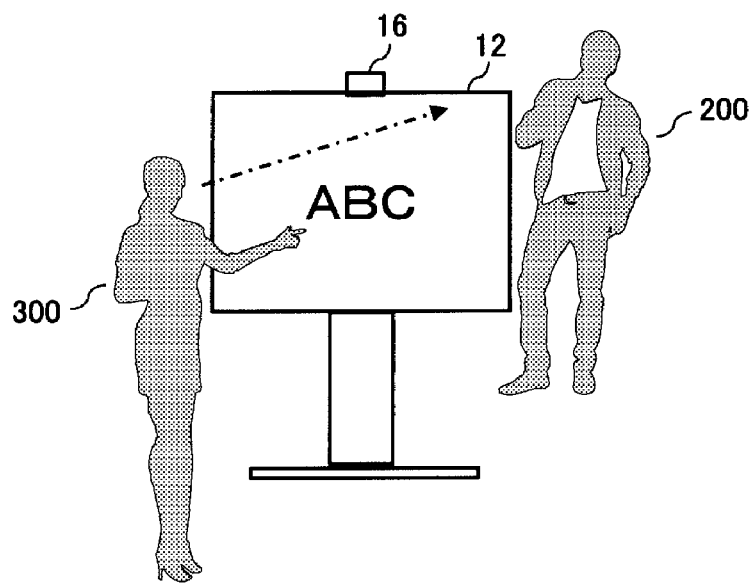

FIGS. 10A and 10B illustrate a state in which the visibility of the screen 12 is changed. The processor 24 sets the screen 12 in the opaque state as a default state so that the screen 12 is not seen through. In this state, as shown in FIG. 10A, the first camera of the sensor 16 detects the person 300 on the side of the first surface 12a of the screen 12, and the processor 24 turns ON the projector 22 to project a horizontally non-inverted image "ABC" on the first surface 12a. The person 300 is able to see the horizontally non-inverted image "ABC", but is unable to see the other side of the screen 12, that is, the second surface 12b of the screen 12, because the screen 12 is in the opaque state. In FIG. 10A, the opaque state of the screen 12 is indicated by hatching. Setting of the screen 12 in the opaque state enhances the visibility of the image "ABC".

Then, when the second camera of the sensor 16 has detected the person 200 on the side of the second surface 12b, the processor 24 changes the screen 12 from the default opaque state to the transparent or translucent state, as shown in FIG. 10B. This enables the person 300 to see the image and also to see the person 200 on the other side of the screen 12, thereby enhancing smooth communication with the person 200.

Instead of simply changing the screen 12 between the two states, that is, the opaque state and the transparent or translucent state, the processor 24 may progressively or sequentially change the screen 12 in order of the opaque state, the translucent state, and the transparent state, or may change the screen 12 in this order in accordance with the zone within which the person 200 is positioned or the level of interest of the person 200. For example, when the person 200 is positioned within the first zone, the processor 24 maintains the screen 12 to be in the opaque state, and when the person 200 sequentially approaches the second zone and the third zone in this order, the processor 24 sequentially increases the transparency of the screen 12. When the person 200 reaches the fourth zone, the processor 24 makes the screen 12 completely transparent. In another example, when the person 200 is positioned within the third zone, if the person 200 does not look at the screen 12 and the level of interest of the person 200 is thus considered to be relatively low, the processor 24 sets the screen 12 in the translucent state. If the person 200 looks at the screen 12 and the level of interest of the person 200 is thus considered to be relatively high, the processor 24 sets the screen 12 in the transparent state. By sequentially increasing the transparency of the screen 12 in accordance with the level of interest of a person on the other side of the screen 12, communication with the person can be enhanced if this person seems to be interested in an image (information) displayed on the screen 12 and communication with the person can be avoided if this person does not show much interest in the image (information).

Figure 11A:
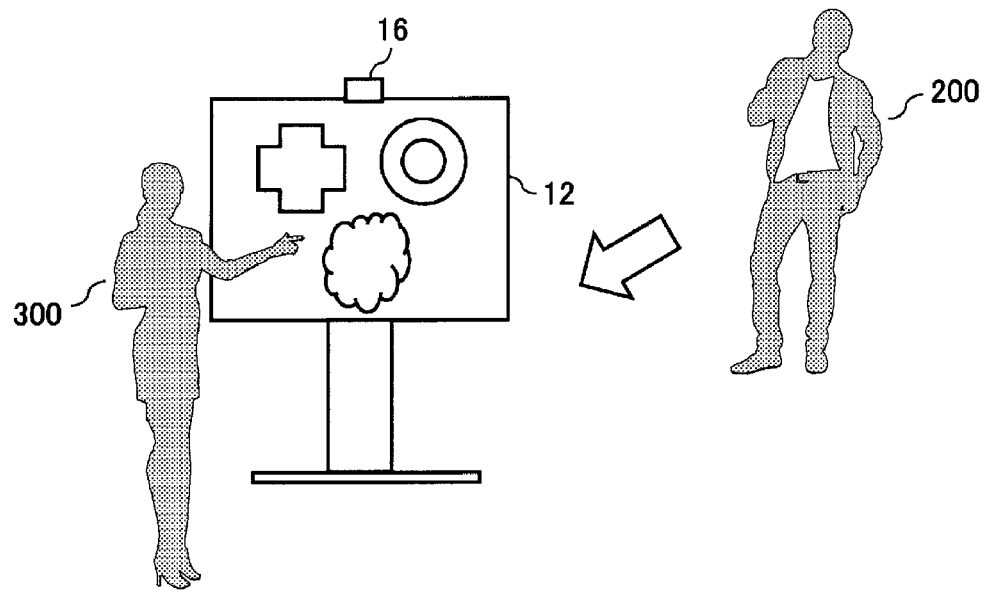
FIGS. 11A and 11B are schematic views for explaining changing of the visibility of a screen.
Figure 11B:
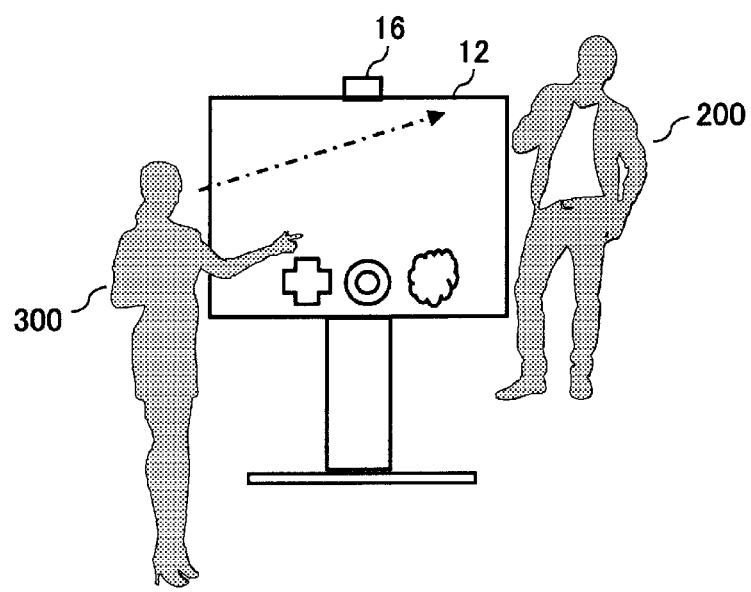

FIGS. 11A and 11B illustrate another mode of a state in which the visibility is changed. The screen 12 is set in the transparent state as a default state, and, as shown in FIG. 11A, the processor 24 turns ON the projector 22 to project predetermined images on the almost entire surface of the screen 12.

Then, when the second camera of the sensor 16 has detected the person 200 on the side of the second surface 12b of the screen 12, the processor 24 projects the predetermined images on the lower portion of the screen 12, as shown in FIG. 11B, so as to enable the person 300 to easily see the person 200 on the side of the second surface 12b without being blocked by the images. Instead of changing the position of the images, the entirety or part of the images may be erased to improve the visibility. In this manner, changing of the position or the content of an image to be projected on the screen 12 enhances the visibility, thereby facilitating communication between people. The processor 24 may change the visibility by sequentially changing the position or the content of an image to be projected on the screen 12 in accordance with the zone within which the person 200 is positioned or the level of interest of the person 200.

As described above, the processor 24 controls the switching of the ON/OFF operations between the projectors 20 and 22 (or switching of the function of the projector 21 between a front projector and a rear projector) in accordance with a detection signal received from the sensor 16. This control processing may be implemented by software processing in accordance with a processing program stored in a program memory, such as a read only memory (ROM), by using a random access memory (RAM) as a working memory. At least part of the processing may be executed by hardware processing by using a circuit, such as an application specific integrated circuit (ASIC) or a field programmable gate array (FPGA).

Figure 12:
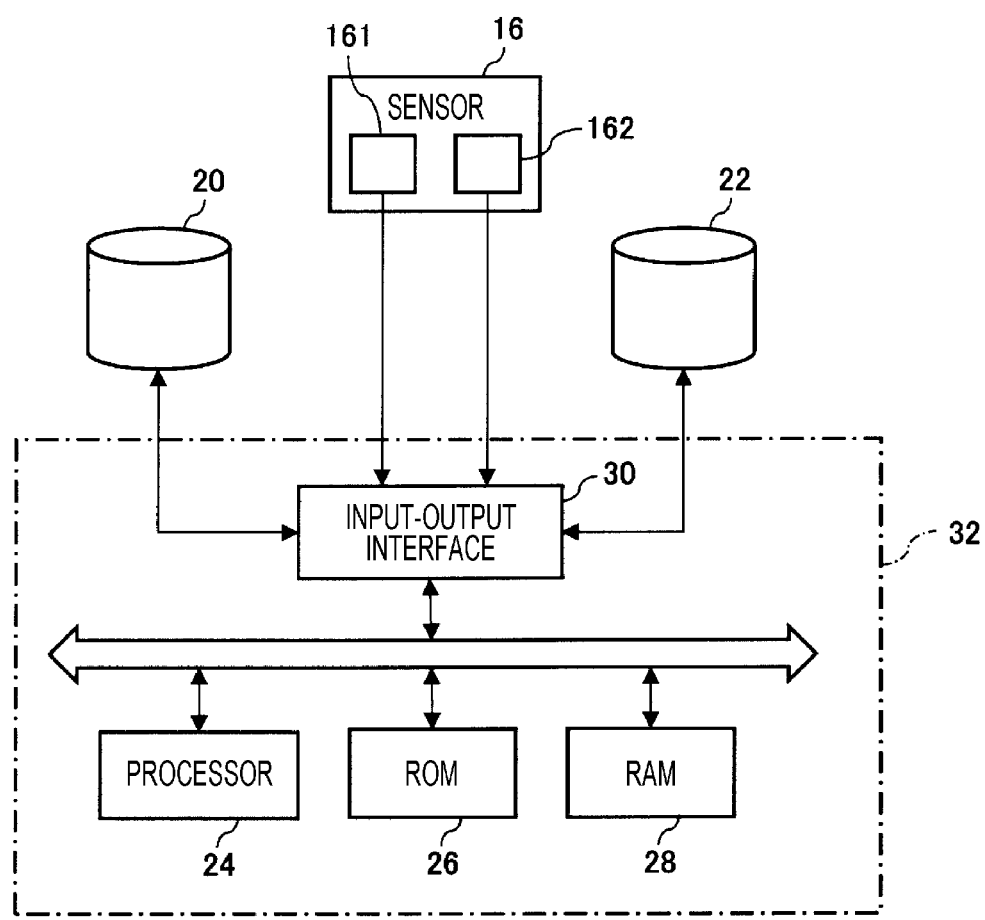
FIG. 12 is a block diagram illustrating the configuration of a control circuit of the display device.

FIG. 12 is a block diagram illustrating the configuration of a control circuit including the processor 24 that executes display control processing of the display device 10.

A microcomputer 32 is loaded within the body 14 of the display device 10. The microcomputer 32 includes a ROM 26, a RAM 28, and an input-output interface 30, as well as the processor 24. The processor 24, the ROM 26, the RAM 28, and the input-output interface 30 are connected to one another via a communication bus. The microcomputer 32 may also include a hard disk drive (HDD) or a solid state drive (SDD) which stores image data, and may be connected to a communication network via a communication interface.

The processor 24 reads a processing program stored in the ROM 26 and executes it by using the RAM 28 as a working memory, thereby executing the above-described processing operations. Operations executed by the processor 24 will be explained more specifically. The processor 24 outputs a control command and image data to be projected on the screen 12 to the projectors 20 and 22 via the input-output interface 30 so as to control the ON/OFF operations of the projectors 20 and 22. The processor 24 receives detection signals (camera image signals) from a first camera 161 and a second camera 162 forming the sensor 16 via the input-output interface 30. The processor 24 then processes the detection signals so as to detect a person and estimate the level of interest of the detected person by using the face direction or the eye direction of the detected person. If a detected person is positioned within the fourth zone and makes a gesture, outputs voice, or performs a touch operation, the processor 24 also receives information concerning such a gesture, voice, or touch operation via the input-output interface 30. The time parameters used for switching the ON/OFF operations between the projectors 20 and 22 by using a predetermined time and the distance parameters used for dividing the detection distance into plural zones are stored in the ROM 26 as part of the processing program. Image data to be projected by the projectors 20 and 22 is stored in an external memory, such as an HDD or an SDD, as discussed above. Such image data may alternatively be supplied from an external server via a communication network.

Processing executed by the processor 24 includes the ON/OFF switching operation between the projectors 20 and 22 (or the front-projection/rear-projection switching operation of the projector 21), the detection operation of people, the determining operation of zones, the estimating operation of the level of interest, and so on. These operations may be executed by plural processors in a distributed manner instead of being executed by a single processor.

Figure 13:
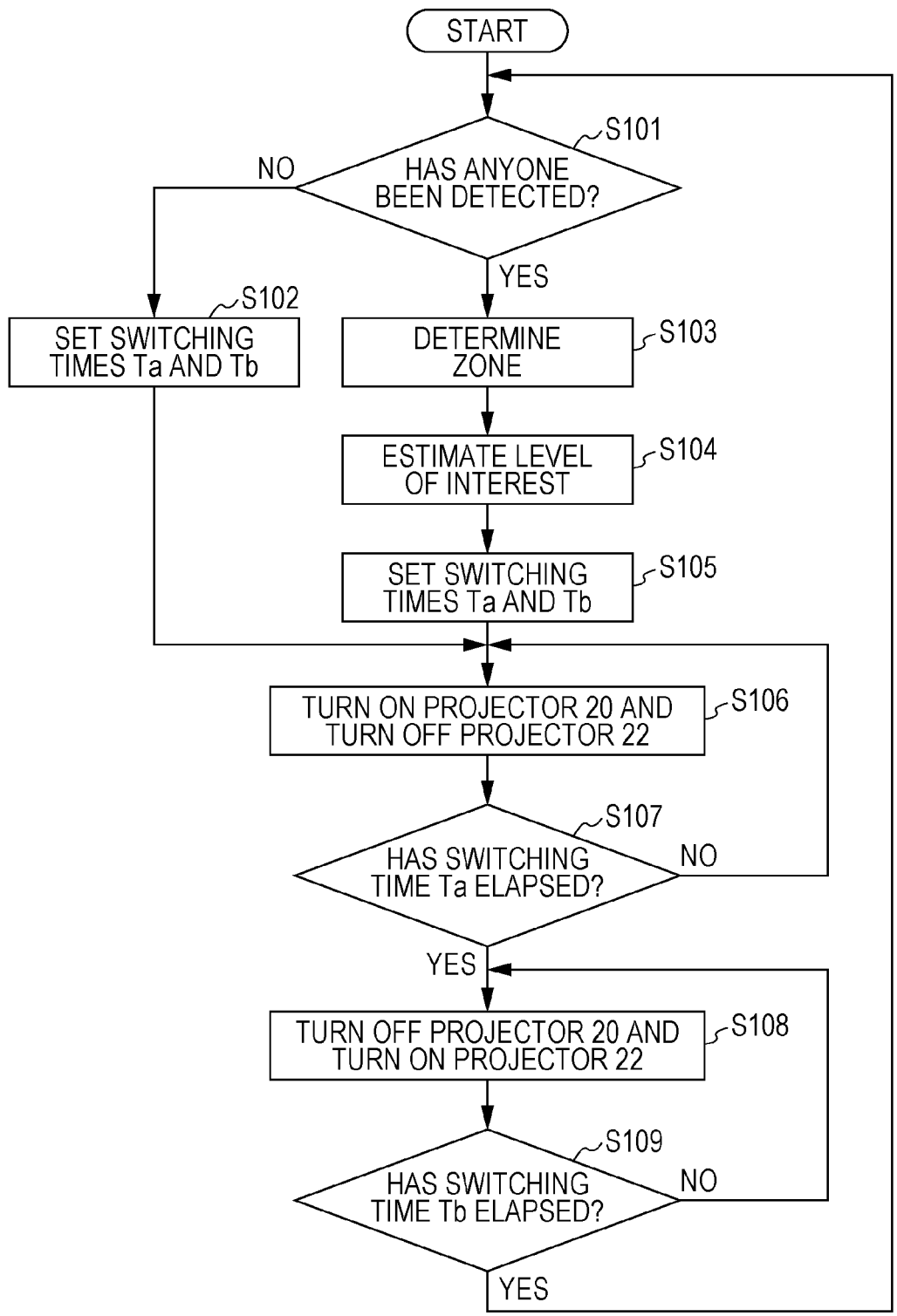
FIG. 13 is a flowchart illustrating an example of processing executed by a processor.

FIG. 13 is a flowchart illustrating an example of processing executed as a result of the processor 24 reading the processing program.

In step S101, when the display device 10 is powered ON to start the individual elements, the processor 24 determines whether the first camera 161 has detected someone on the side of the first surface 12a of the screen 12 and whether the second camera 162 has detected someone on the side of the second surface 12b of the screen 12. More specifically, the processor 24 receives image data obtained by the first camera 161 and that by the second camera 162 so as to extract images of people from the image data. To extract image of people, template matching processing or processing using neural network models obtained by learning may be used.

If nobody has been detected neither on the side of the first surface 12a nor the side of the second surface 12b (NO in step S101), the processor 24 sets a switching time Ta and a switching time Tb in step S102. When the predetermined time is T1, the processor 24 sets the switching times Ta and Tb to be Ta=Tb=T1. The switching time Ta is a time for which the projector 20 is ON and the projector 22 is OFF. The switching time Tb is a time for which the projector 20 is OFF and the projector 22 is ON.

After setting the switching times Ta and Tb in step S102, the processor 24 turns ON the projector 20 and turns OFF the projector 22 in step S106. Turning ON the projector 20 can project a horizontally non-inverted image on the second surface 12b.

Then, the processor 24 determines in step S107 whether the switching time Ta has elapsed after turning ON the projector 20. If the switching time Ta has not elapsed (NO in step S107), the processor 24 continues to turn ON the projector 20.

If the switching time Ta has elapsed (YES in step S107), the processor 24 turns OFF the projector 20 and turns ON the projector 22 in step S108. Turning ON the projector 22 can project a horizontally non-inverted image on the first surface 12a.

Then, the processor 24 determines in step S109 whether the switching time Tb has elapsed after turning ON the projector 22. If the switching time Tb has not elapsed (NO in step S109), the processor 24 continues to turn ON the projector 22. If the switching time Tb has elapsed (YES in step S109), the processor 24 returns to step S101 and repeats steps S101 through S109. With this operation, if nobody is detected, the projectors 20 and 22 are alternately turned ON based on the same switching time Ta=Tb=T1 so that a horizontally non-inverted image will be repeatedly projected on the second surface 12b and the first surface 12a alternately.

If someone is detected on the side of at least one of the first and second surfaces 12a and 12b (YES in step S101), the processor 24 determines the zone within which the detected person is positioned in step S103. The processor 24 estimates the level of interest of the detected person in step S104. The processor 24 may determine the zone by measuring the distance R from the screen 12 to the detected person and then by comparing the distance R with the preset distance thresholds R1, R2, and R3 (see FIG. 6). The processor 24 may estimate the level of interest of the detected person in accordance with whether the detected person is still (first zone), whether the face direction of the detected person faces the screen 12 (second zone), whether the eye direction of the detected person directs toward the screen 12 (third zone), and whether the detected person 12 has showed some reaction for the screen 12 (fourth zone). If the levels of interest of people detected within the first through fourth zone are set to be:

within first zone: I1
within second zone: I2
within third zone: I3
within fourth zone: I4, the levels of interests are typically estimated at $I1<I2<I3<I4$. If the level of interest of a person being still within the first zone is $I1s$, while that of a person moving within the first zone is $I1m$, the levels of interests are estimated at $I1m<I1s$. If the level of interest of a person facing the screen 12 within the second zone is $I2s$, while that of a person who does not face the screen 12 within the second zone is $I2m$, the levels of interests are estimated at $I2m<I2s$. If the level of interest of a person looking at the screen 12 within the third zone is $I3s$, while that of a person who does not look at the screen 12 within the third zone is $I3m$, the levels of interests are estimated at $I3m<I3s$. If the level of interest of a person showing some reaction for the screen 12 within the fourth zone is $I4s$, while that of a person who does not show any reaction for the screen 12 within the fourth zone is $I4m$, the levels of interests are estimated at $I4m<I4s$.

After determining the zone in step S103 and estimating the level of interest in step S104, the processor 24 sets the switching times Ta and Tb by using at least one of the zone and the level of interest in step S105. Setting of the switching times Ta and Tb may be performed by using a predetermined function having at least one of the zone and the level of interest as a dependent variable. Alternatively, a table which defines the association between at least one of the zone and the level of interest and the switching times Ta and Tb may be used. The function or the table is also stored in the ROM 26 as part of the processing program. It is now assumed that the switching times Ta and Tb are set by using the table which defines the above-described association. If the first camera 161 has detected the person 300 within the first zone and if the second camera 162 has not detected anyone, the switching times Ta and Tb are set to be Ta=Tb=T1. If the first camera 161 has detected the person 300 within the second zone and the second camera 162 has detected the person 200 within the second zone and if the level of interest of the person 300 is higher than that of the person 200, the switching times Ta and Tb are set to be Ta<Tb. If the first camera 161 has detected the person 300 within the fourth zone and if the second camera 162 has detected the person 200 within the third zone, the switching times Ta and Tb are set to be Ta<<Tb. Setting of Ta<Tb means that the time for which the projector 22 is ON is longer than that for which the projector 20 is ON and thus means that a horizontally non-inverted image viewed by a person having a higher level of interest will be projected for a longer time. Setting of the switching times Ta and Tb is not restricted to these examples, and those who skilled in the art are capable of setting the switching times Ta and Tb by using at least one of the zone and the level of interest. The level of interest of a detected person may be estimated by including the position (zone) of this person, and then, the switching times Ta and Tb may be set by using the estimated level of interest.

After setting the switching times Ta and Tb in step S105, the processor 24 turns ON the projector 20 and turns OFF the projector 22 in step S106. Turning ON the projector 20 can project a horizontally non-inverted image on the second surface 12b.

Then, the processor 24 determines in step S107 whether the switching time Ta has elapsed after turning ON the projector 20. If the switching time Ta has not elapsed (NO in step S107), the processor 24 continues to turn ON the projector 20.

If the switching time Ta has elapsed (YES in step S107), the processor 24 turns OFF the projector 20 and turns ON the projector 22 in step S108. Turning ON the projector 22 can project a horizontally non-inverted image on the first surface 12a.

Then, the processor 24 determines in step S109 whether the switching time Tb has elapsed after turning ON the projector 22. If the switching time Tb has not elapsed (NO in step S109), the processor 24 continues to turn ON the projector 22. If the switching time Tb has elapsed (YES in step S109), the processor 24 returns to step S101 and repeats steps S101 through S109.

The processing will be described specifically by way of example.

It is now assumed that the person 300 is positioned within the second zone and the person 200 is also positioned within the second zone and that the level of interest of the person 300 and that of the person 200 are the same. The processor 24 thus sets the switching times Ta and Tb to be Ta=Tb. The period for which the projector 20 is ON and that for which the projector 22 is ON are equal to each other, and horizontally non-inverted images are alternately projected on the first surface 12a and the second surface 12b of the screen 12. For example, when the front side and the back side of a document are alternately projected by the projectors 20 and 22, a horizontally non-inverted image on the front side is projected by the projector 20→a horizontally non-inverted image on the back side is projected by the projector 22→a horizontally non-inverted image on the back side is projected by the projector 20→a horizontally non-inverted image on the front side is projected by the projector 22→ . . . . The person 300 thus views a horizontally non-inverted image of the front side and that of the back side in order of the front side→back side→front side→back side→ . . . . It appears to the person 300 as if the document were rotating around the center axis in the vertical direction. It also appears to the person 200 as if the document were rotating.

In this state, if the person 300 approaches the screen 12 up to the third zone and gazes at the screen 12, the processor 24 detects the eye direction of the person 300 and estimates the level of interest of the person 300 at a high level. The processor 24 then considerably increases the switching time Tb and sets it to be Ta<<Tb. As a result, the period for which the projector 22 is turned ON, that is, the period for which the person 300 is seeing the horizontally non-inverted image, considerably increases. It thus appears to the person 300 as if the rotating document were temporarily stopped. The person 300 is thus able to see the content of the document in greater details.

In this state, if the person 200 also approaches the screen 12 up to the third zone and gazes at the screen 12, the processor 24 estimates the level of interest of the person 300 and that of the person 200, and if the processor 24 determines that the level of interest of the person 300 and that of the person 200 are the same, it resets the switching times Ta and Tb to be Ta=Tb. Then, it again appears to the persons 300 and 200 as if the document were rotating around the central axis in the vertical direction. If the person 300 then approaches the screen 12 up to the fourth zone and gives an instruction by saying or making a gesture "stop" or touching the screen 12, the processor 24 sets the switching times Ta and Tb to be Ta<<Tb again. It thus appears to the person 300 as if the rotating document were temporarily stopped.

The exemplary embodiment has been discussed above. However, the invention is not restricted to this exemplary embodiment, and various modifications may be made. Some modified examples will be described below.

First Modified Example

In the above-described exemplary embodiment, the display device 10 includes the screen 12 and one projector 21 or two projectors 20 and 22. The screen 12 may be constituted by a liquid crystal display. In this case, the liquid crystal display is desirably formed as a transparent liquid crystal display so that a person can see the other side of the display. If the liquid crystal display is not a transparent liquid crystal display, it may still look like a pseudo-transparent display by attaching opaque liquid crystal displays to each other and by superposing background images captured by cameras on the opposite sides.

Second Modified Example

In the above-described exemplary embodiment, the position, face direction, eye direction, and reaction of a detected person are used for estimating the level of interest of this person. In addition to these factors, the time for which a detected person has been staying near the screen 12 may also be used for estimating the level of interest of the detected person. As the time for which a detected person has been staying is longer, the processor 24 may estimate the level of interest at a higher level.

Third Modified Example

In the above-described exemplary embodiment, when the plural persons 200-1 and 200-2 are detected on the side of the second surface 12b of the screen 12, as shown in FIG. 9B, the level of interest of each of the persons 200-1 and 200-2 is estimated. However, as the representative level of interest of plural persons on the side of the first surface 12a or the second surface 12b, the total level of interest of the plural persons may be calculated or the highest level of interest among the levels of interest of the individual persons may be calculated.

Fourth Modified Example

In the above-described exemplary embodiment, as shown in FIG. 13, the level of interest of a detected person is estimated by using the position, face direction, eye direction, and reaction of the detected person. More simply, without estimating the level of interest, the ON/OFF operations between the projectors 20 and 22 may be switched directly in accordance with the position, face direction, eye direction, and reaction of a detected person. In this configuration, although the level of interest is not clearly indicated, it is indirectly reflected in the switching operations of the projectors 20 and 22 by means of the position, face direction, eye direction, and reaction of the detected person.

Figure 14:
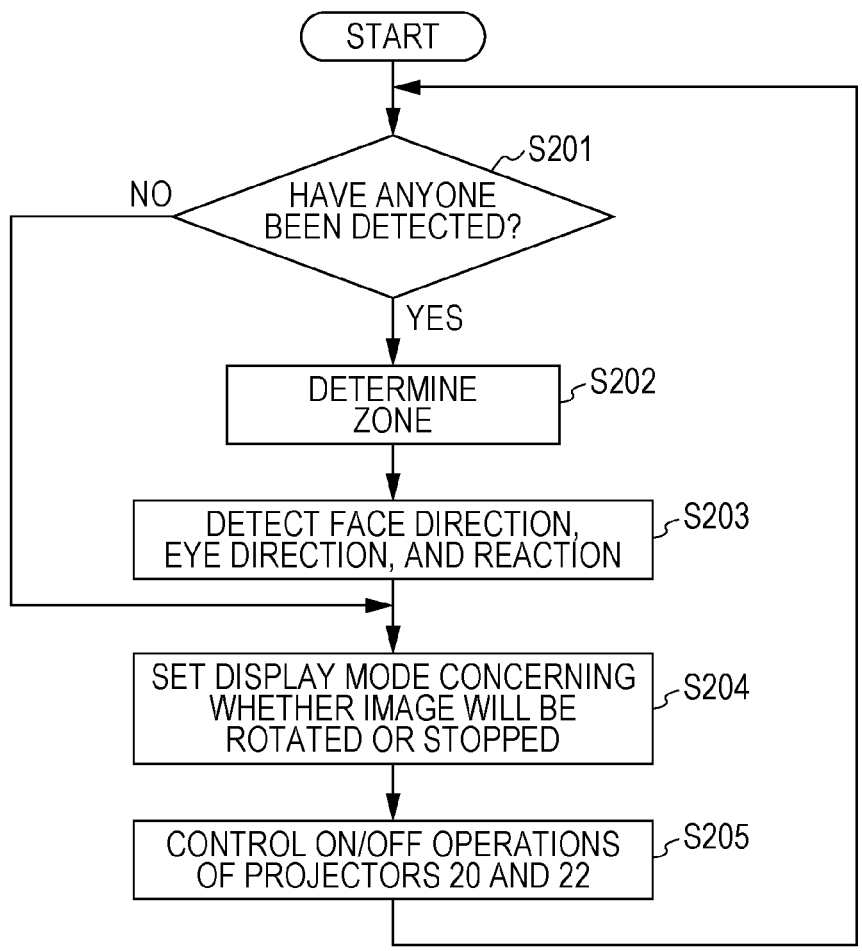
FIG. 14 is a flowchart illustrating another example of processing executed by the processor.

FIG. 14 is a flowchart illustrating processing executed by the processor 24 in this configuration.

The processor 24 determines in step S201 whether the first camera 161 has detected someone on the side of the first surface 12a and whether the second camera 162 has detected someone on the side of the second surface 12b by using detection signals (image signals) from the first and second cameras 161 and 162.

If nobody has been detected (NO in step S201), in step S204, the processor 24 sets a default image display mode, which is used when nobody has been found, concerning whether an image will be rotated or stopped. For example, an image is rotated for a certain period of time, or an image is displayed only on the first surface 12a and is fixed there. Then, in step S205, the processor 24 turns ON and OFF the projectors 20 and 22 so that the image display mode set in step S204 can be performed. If the processor 24 has set the image display mode so that the image would be rotated, it alternately turns ON and OFF the projectors 20 and 22 at regular intervals. If the processor 24 has set the image display mode so that the image would be stopped (fixed), the processor 24 only keeps turning ON the projector 22, for example.

If someone has been detected (YES in step S201), the processor 24 determines the zone within which the detected person is positioned in step S202, and detects the face direction, eye direction, and reaction of the detected person in step S203. Then, in step S204, the processor 24 refers to a table stored in a memory, which defines the association between the image display mode (rotate or stop) and the zone, face direction, eye direction, reaction so as to set the image display mode. Then, in step S205, the processor 24 turns ON and OFF the projectors 20 and 22 so that the image display mode set in step S204 can be performed. More specifically, if the person 300 is detected within the first zone on the side of the first surface 12a and if the person 300 faces the screen 12, the processor 24 sets the image display mode so that the image will be stopped, and only keeps turning ON the projector 22 to keep displaying a horizontally non-inverted image on the first surface 12a. If the person 300 is detected within the first zone on the side of the first surface 12a and the person 200 is also detected within the first zone on the side of the second surface 12b, and if both of the persons 200 and 300 are facing the screen 12, the processor 24 sets the image display mode so that the images will rotate and alternately turns ON and OFF the projectors 20 and 22.

As the above-described table stored in a memory, a first table for a case in which a person is detected on the side of one of the first and second surfaces 12a and 12b and a second table for a case in which a person is detected on the sides of both of the first and second surfaces 12a and 12b may be used.

In the flowchart of FIG. 14, the processor 24 may set the image display mode (rotate or stop) in accordance with at least one of the position, face direction, eye direction of a detected person, and the time for which this person has been staying near the screen 12. Those who skilled in the art are capable of changing the image display mode by combining these factors in a desired manner. Changing of the image display mode may be controlled by switching the ON/OFF operations between the projectors 20 and 22 and by switching the projecting of horizontally non-inverted images by the projectors 20 and 22. The ON/OFF operations between the projectors 20 and 22 may be switched by varying the duty ratio of the period for which the projector 20 is ON to that for which the projector 22 is ON.

Fifth Modified Example

In the above-described exemplary embodiment, the image display state is changed also in accordance with the reaction of a detected person. In this case, in accordance with a specific reaction of a detected person, part of an image may be enlarged or reduced or be rotated. For example, when the projector 20 is turned ON to display an image "ABC" for the person 200, if the person 200 gestures to spread the palm of a hand or to spread the fingers apart, the processor 24 may detect such a gesture and enlarge the image "ABC". If the person 200 gestures to turn the wrist, the processor 24 may detect such a gesture and rotate the image. Instead of projecting a single image, plural images may be projected, as shown in FIGS. 11A and 11B. The plural images may be rotated together, and in accordance with a specific reaction or the eye direction of the person 200, the processor 24 may stop rotating the images.

Sixth Modified Example

In the above-described exemplary embodiment, the time for which a detected person has been staying near the screen 12 is detected. In this case, the time for which a detected person has been staying or viewing the screen 12 may be measured, and if such a time reaches a certain time, the display device 10 may offer an incentive to this person via a certain medium. For example, if an image displayed on the screen 12 concerns an advertisement, a coupon related to this advertisement may be issued to this person.

Seventh Modified Example

In the above-described exemplary embodiment, the processor 24 may rotate an image when detecting a person. In this case, sound, light, or a breeze may be output from the display device 10 together with the rotation of the image.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
a display configured to control switching between transparent or translucent and opaque;
a detector; and
a controller configured to, if the detector detects a first person on a side of a first surface of the display and a second person on a side of a second surface of the display, then control the display so that the first person and the second person can see each other through the display,
wherein the display is switchable between a see-through enable state in which the display is see-through and a see-through disable state in which the display is not see-through, and
wherein the controller is configured to, if the detector has detected a person viewing the first surface and a person viewing the second surface, change the display from the see-through disable state to the see-through enable state.

2. The display device according to claim 1, wherein the controller is configured to progressively change the display from the see-through disable state to the see-through enable state in accordance with at least one of a position of each of the detected persons, a face direction of each of the detected persons, an eye direction of each of the detected persons, and whether each of the detected persons has shown a reaction to the display.

3. A display device comprising:
a display configured to control switching between transparent or translucent and opaque;
a detector; and
a controller configured to, if the detector detects a first person on a side of a first surface of the display and a second person on a side of a second surface of the display, then control the display so that the first person and the second person can see each other through the display,
wherein the detector is configured to detect that a face of the first person is directed at the first surface,
wherein the detector is configured to detect that a face of the second person is directed at the second surface, and
wherein the controller is configured to, if the detector detects that the face of the first person is directed at the first surface and the face of the second person is directed at the second surface, then control the display so that the first person and the second person can see each other through the display.

4. A display device comprising:
a display configured to control switching between transparent or translucent and opaque;
a detector; and
a controller configured to, if the detector detects a first person on a side of a first surface of the display and a second person on a side of a second surface of the display, then control the display so that the first person and the second person can see each other through the display,
wherein the detector is configured to detect that an eye of the first person is directed at the first surface,
wherein the detector is configured to detect that an eye of the second person is directed at the second surface, and
wherein the controller is configured to, if the detector detects that the eye of the first person is directed at the first surface and the eye of the second person is directed at the second surface, then control the display so that the first person and the second person can see each other through the display.

* * * * *